United States Patent
Yokota et al.

(10) Patent No.: US 10,041,148 B2
(45) Date of Patent: Aug. 7, 2018

(54) PB-FREE COPPER ALLOY SLIDING MATERIAL

(75) Inventors: Hiromi Yokota, Aichi (JP); Daisuke Yoshitome, Aichi (JP)

(73) Assignee: TAIHO KOGYO CO., LTD., Toyota-shi (JP)

( * ) Notice: Subject to any disclaimer, the term of this patent is extended or adjusted under 35 U.S.C. 154(b) by 1086 days.

(21) Appl. No.: 13/555,639

(22) Filed: Jul. 23, 2012

(65) Prior Publication Data

US 2012/0294750 A1 Nov. 22, 2012

Related U.S. Application Data

(63) Continuation of application No. 12/376,381, filed as application No. PCT/JP2007/065125 on Aug. 2, 2007.

(30) Foreign Application Priority Data

Aug. 5, 2006 (JP) .................................. 2006-213986
Aug. 11, 2006 (JP) .................................. 2006-219709

(51) Int. Cl.
*C22C 9/00* (2006.01)
*C22C 32/00* (2006.01)
*C22C 9/02* (2006.01)

(52) U.S. Cl.
CPC .................. *C22C 9/00* (2013.01); *C22C 9/02* (2013.01); *C22C 32/0089* (2013.01); *F16C 2204/12* (2013.01)

(58) Field of Classification Search
CPC ...... B22F 7/08; F16C 33/121; F16C 2204/12; F16C 2204/18; C22C 9/00; C22C 9/02;
(Continued)

(56) References Cited

U.S. PATENT DOCUMENTS

| 4,551,395 A | 11/1985 | Lloyd |
| 5,198,154 A | 3/1993 | Yokoyama et al. |

(Continued)

FOREIGN PATENT DOCUMENTS

| EP | 1605069 A1 | 12/2005 |
| GB | 2355016 A | 4/2001 |

(Continued)

OTHER PUBLICATIONS

Extended European Search Report, dated Mar. 12, 2012, in European Application No. 07791805.0.
(Continued)

*Primary Examiner* — Keith Walker
*Assistant Examiner* — John A Hevey
(74) *Attorney, Agent, or Firm* — Birch, Stewart, Kolasch & Birch, LLP

(57) ABSTRACT

When a Cu—Sn—Bi had—particle based sliding material is used for sliding, Cu of Cu matrix flows and covers up Bi phase. Seizure resistance lowers as time passes. A Pb-free sliding material preventing the reduction of seizure resistance is provided. (1) Composition: from 1 to 15% of Sn, from 1 to 15% of Bi, from 0.02 to 0.2% of P, and from 1 to 10% of hard particles having an average diameter of from 50 to 70 μm, with the balance being Cu and unavoidable impurities. (2) Structure: Bi phase and the hard particles are dispersed in the copper matrix, and all of said hard particles are bonded to the copper matrix.

8 Claims, 2 Drawing Sheets

Example 5

(58) Field of Classification Search
CPC .... C22C 9/04; C22C 9/08; C22C 1/0425; C22C 32/0089; Y02T 10/865
See application file for complete search history.

(56) References Cited

U.S. PATENT DOCUMENTS

| | | | |
|---|---|---|---|
| 5,279,638 | A | 1/1994 | Asada et al. |
| 5,489,487 | A | 2/1996 | Tanaka et al. |
| 5,938,864 | A | 8/1999 | Tomikawa et al. |
| 6,025,081 | A | 2/2000 | Ohshiro et al. |
| 6,254,701 | B1 | 7/2001 | Oshiro et al. |
| 6,652,675 | B2 | 11/2003 | Sakai et al. |
| 2001/0019779 | A1 | 9/2001 | Sakai et al. |
| 2001/0021353 | A1 | 9/2001 | Sakai et al. |
| 2003/0008169 | A1 | 1/2003 | Sakai et al. |
| 2003/0064239 | A1 | 4/2003 | Saitou et al. |
| 2006/0000527 | A1 | 1/2006 | Yokota et al. |
| 2006/0172073 | A1* | 8/2006 | Groza ............ B22F 7/08 427/421.1 |
| 2007/0042218 | A1 | 2/2007 | Lang et al. |
| 2008/0095658 | A1 | 4/2008 | Yokota et al. |

FOREIGN PATENT DOCUMENTS

| | | | |
|---|---|---|---|
| GB | 2360294 | A | 9/2001 |
| GB | 2386610 | A | 9/2003 |
| JP | 61-73849 | A | 4/1986 |
| JP | 3-247732 | A | 11/1991 |
| JP | 4-28802 | A | 1/1992 |
| JP | 4-28836 | A | 1/1992 |
| JP | 7-9046 | B2 | 2/1995 |
| JP | 7-118777 | A | 5/1995 |
| JP | 7-179964 | A | 7/1995 |
| JP | 8-53725 | A | 2/1996 |
| JP | 8-19945 | B2 | 3/1996 |
| JP | 9-125176 | A | 5/1997 |
| JP | 10-46272 | A | 2/1998 |
| JP | 10-330868 | A | 12/1998 |
| JP | 3108363 | B2 | 11/2000 |
| JP | 2001-81523 | A | 3/2001 |
| JP | 2001-107106 | A | 4/2001 |
| JP | 2001-107161 | A | 4/2001 |
| JP | 2001-053141 | A | 6/2001 |
| JP | 2001-220630 | A | 8/2001 |
| JP | 2001-234265 | A | 8/2001 |
| JP | 2001-240925 | A | 9/2001 |
| JP | 2002-12902 | A | 1/2002 |
| JP | 2002-60869 | A | 2/2002 |
| JP | 3421724 | B2 | 6/2003 |
| JP | 3560723 | B2 | 9/2004 |
| JP | 2005-163074 | A | 6/2005 |
| JP | 2005-200703 | A | 7/2005 |
| JP | 2005-350722 | A | 12/2005 |
| JP | 2006-37180 | A | 2/2006 |
| JP | 2006-200024 | A | 8/2006 |
| JP | 2006-281292 | A | 10/2006 |
| WO | WO 2005/033353 | A2 | 4/2005 |
| WO | WO2005/068671 | * | 7/2005 |

OTHER PUBLICATIONS

Extended European Search Report, dated Oct. 20, 2008, in European Application No. 08013143.6.
International Preliminary Report on Patentability and Translation of the Written Opinion of the International Searching Authority, dated Aug. 19, 2009, in International Application No. PCT/JP2008/052320.
International Preliminary Report on Patentability and Translation of the Written Opinion of the International Searching Authority, dated Aug. 22, 2006, in International Application No. PCT/JP2005/000302 (including foreign language version dated Jul. 17, 2006).
International Preliminary Report on Patentability and Translation of the Written Opinion of the International Searching Authority, dated Aug. 31, 2010, in International Application No. PCT/JP2009/050995 (including foreign language version dated Jul. 27, 2010).
International Preliminary Report on Patentability and Translation of the Written Opinion of the International Searching Authority, dated Feb. 10, 2009, in International Application No. PCT/JP2007/065125 (including foreign language version dated Feb. 10, 2009).
International Preliminary Report on Patentability and Translation of the Written Opinion of the International Searching Authority, dated Nov. 24, 2009, in International Application No. PCT/JP2008/058851 (including foreign language version dated Sep. 29, 2009).
International Preliminary Report on Patentability and Translation of the Written Opinion of the International Searching Authority, dated Oct. 8, 2009, in International Application No. PCT/JP2008/054524 (including foreign language version dated Sep. 15, 2009).
International Search Report, dated Apr. 15, 2008, in International Application No. PCT/JP2008/054524 (including English translation).
International Search Report, dated Jul. 1, 2008, in International Application No. PCT/JP2008/058851 (including English translation).
International Search Report, dated Mar. 18, 2008, in International Application No. PCT/JP2008/052320 (including English translation).
International Search Report, dated Mar. 31, 2009, in International Application No. PCT/JP2009/050995 (including English translation).
International Search Report, dated May 17, 2005, in International Application No. PCT/JP2005/000302 (including English translation).
International Search Report, dated Oct. 9, 2007, in International Application No. PCT/JP2007/065125 (including English translation).
Rabinowicz, "Friction and Wear of Materials," Second Edition, John Wiley & Sons, Inc., 1995, pp. 32-33 and 38-39.
Supplementary Partial European Search Report, dated Apr. 18, 2007, in European Application No. 0503541.2.
Tribology Institute of Japan, "Development of Sulfuring-resistant Bearing Material," Pre-lecture Paper of Tribology Conference of Tribology Institute of Japan, May 2003, 2 pages (including partial English translation).
U.S. Advisory Action, dated Jul. 27, 2009, in U.S. Appl. No. 11/148,186.
U.S. Advisory Action, dated Nov. 6, 2007, in U.S. Appl. No. 11/148,186.
U.S. Communication Withdrawing Notice of Non-Responsive Amendment, dated Oct. 26, 2011, in U.S. Appl. No. 12/527,003.
U.S. Examiner Interview Summary, dated Aug. 13, 2009, in U.S. Appl. No. 11/148,186.
U.S. Examiner Interview Summary, dated Jun. 5, 2008, in U.S. Appl. No. 11/148,186.
U.S. Notice of Allowance, dated Oct. 15, 2010, in U.S. Appl. No. 11/148,186.
U.S. Notice of Allowance, dated Oct. 21, 2009, in U.S. Appl. No. 10/585,993.
U.S. Notice of Non-Responsive Amendment, dated May 5, 2008, in U.S. Appl. No. 11/148,186.
U.S. Notice of Non-Responsive Amendment, dated Oct. 7, 2011, in U.S. Appl. No. 12/527,003.
U.S. Office Action, dated Apr. 1, 2010, in U.S. Appl. No. 11/148,186.
U.S. Office Action, dated Apr. 5, 2011, in U.S. Appl. No. 12/600,178.
U.S. Office Action, dated Apr. 6, 2011, in U.S. Appl. No. 12/376,381.
U.S. Office Action, dated Aug. 19, 2008, in U.S. Appl. No. 11/148,186.
U.S. Office Action, dated Dec. 9, 2011, in U.S. Appl. No. 12/600,178.
U.S. Office Action, dated Feb. 3, 2009, in U.S. Appl. No. 10/585,993.
U.S. Office Action, dated Jan. 23, 2012, in U.S. Appl. No. 12/376,381.

(56) References Cited

OTHER PUBLICATIONS

U.S. Office Action, dated Jul. 18, 2012, in U.S. Appl. No. 12/527,003.
U.S. Office Action, dated Jun. 30, 2008, in U.S. Appl. No. 10/585,993.
U.S. Office Action, dated Mar. 31, 2011, in U.S. Appl. No. 12/527,003.
U.S. Office Action, dated Mar. 9, 2009, in U.S. Appl. No. 11/148,186.
U.S. Office Action, dated May 7, 2007, in U.S. Appl. No. 11/148,186.
U.S. Office Action, dated Oct. 10, 2006, in U.S. Appl. No. 11/148,186.
U.S. Response to Examiner Interview Summary, dated Jun. 17, 2008, in U.S. Appl. No. 11/148,186.
U.S. Response to Examiner Interview Summary, dated Oct. 9, 2009, in U.S. Appl. No. 10/585,993.

* cited by examiner

Example 5

Example 9

Example 21

Comparative Example 2

PB-FREE COPPER ALLOY SLIDING MATERIAL

This application is a Continuation of co-pending U.S. patent application Ser. No. 12/376,381, filed Jun. 24, 2010, which is the U.S. National Phase of PCT/JP2007/065125, filed Aug. 2, 2007. Priority is claimed thereto under 35 U.S.C. § 120. This application also claims priority under 35 U.S.C. § 119(a) to Japanese Patent Application No. 2006-213986, filed in Japan on Aug. 5, 2006 and Japanese Patent Application No. 2006-219709, filed in Japan on Aug. 11, 2006. The entire contents of all are herein incorporated by reference.

TECHNICAL FIELD

The present invention relates to a copper-based sintered alloy, more particularly to a Pb-free sintered copper-based alloy sliding material which exhibits improved sliding property notwithstanding being Pb free.

Pb, which is usually added to a copper alloy for use as a sliding member, expands and is ductile on the sliding surface as temperature rises during sliding. Seizure is prevented by simultaneous functions of Pb, that is, cooling of the sliding surface and excellent self-lubricating properties. In addition, since Pb forms a soft dispersing phase, excellent conformability and excellent ability to receive foreign matters are provided. However, Pb is liable to be corroded by acids excepting sulfuric acid and is toxic. Therefore, there have been developed Cu—Bi based sintered alloys for use as a sliding material, in which alloy Bi substitutes for Pb. The copper matrix and Bi phase are separated from one another in the structure of Cu—Bi based sintered alloy. The Bi phase present on the sliding surface effectively provides seizure resistance.

Patent Document 1, Japanese Patent No. 3421724 is one of such prior art. It discloses a composition composed of from 0.5 to 15% by weight of Sn, from 1 to 20% by weight of Bi, from 0.1 to 10% by volume of hard particles selected from the group consisting of boride, silicide, oxide, nitride, carbide, intermetallic compound, with the balance being Cu. Average particle diameter of the hard particles is from 1 to 45 μm. The hard particles are present in the Bi phase, which is dispersed in the copper matrix. Since the hard particles are present in the Bi phase, which is soft, Bi serves as a cushion for the hard particles, to thereby mitigate damage that may be exerted by the hard particles which are exposed on the surface of copper matrix onto a mating member. Also, a property of the Bi phase is such that it contains and holds the hard particles that have been separated. In the drawings of Patent Document 1, each hard particle is surrounded by the Bi phase on the sliding surface either completely or partially, with the rest of the hard particles being bonded to the copper matrix.

Another example of the prior art is Patent Document 2, Japanese Unexamined Patent Publication (kokai) No. 2005-200703 filed by the present applicant. The proposed sintered copper alloy contains, by mass %, from 1 to 15% of Sn, from 1 to 15% of Bi, and from 0.1 to 10% of hard particles having an average particle diameter of 10 to 50 μm. With regard to the Bi phase that is in contact with the hard particles, the percentage of the hard particles, whose contact ratio with Bi phase is 50% or less based on the entire periphery of the hard particles, is 70% or more. When the contact ratio of hard particles mentioned above is 50%, it means that one hard particle is in contact with the Bi phase at 50% of the peripheral length of the hard particle, whereas the other 50% the hard particle is in contact with the copper matrix. This ratio is referred to in Patent Document 2 to as "the hard-particle contact ratio." Since the hard-particle contact ratio is 50% or less in Patent Document 2, the length of hard particle(s) in contact with the copper matrix is larger than a contact length with the Bi phase. In Patent Document 2, 70% or more relative to the entire hard particles is such hard particles. This ratio is referred to in Patent Document 2 to as "hard particle presence ratio" and attains 94% at the highest. The balance of 94%, i.e., 6%, corresponds to the hard-particle having 50% to 100% of the hard-particle contact ratio. In the case of 100%, hard particles are completely surrounded by the Bi phase.

Therefore, in Patent Document 2 when the individual hard particles are looked at, a half or less of the length of one particle is incorporated in the Bi phase. When the hard particles are looked as a whole, the structure is controlled such that the ratio at which the hard particles remain in non-contact with the Bi phase, is as high as possible. For the purpose of such structure controlling, a high-frequency sintering is carried out for a short period of time.

Patent Document 1: Japanese Patent No. 3421724
Patent Document 2: Japanese Unexamined Patent Publication (kokai) No. 2005-200703

DISCLOSURE OF THE INVENTION

Problems to be Solved by the Invention

In conventional Cu—Sn—Bi based sintered alloys, the Bi phase present on the sliding surface is expected to enhance the seizure resistance. Specifically, the Bi phase is expected to be compatible with a mating shaft during an initial sliding period, then making the surface of the sliding material to become so stable that seizure is difficult to occur. However, during stationary sliding, the Cu phase is caused to flow by a mating shaft, and thus covers up the Bi phase. As a result, the Bi phase exposed surface of gradually decreases, and, hence the seizure resistance disadvantageously lowers as compared with the initial level. Therefore, an aim of the present invention is to provide a Cu—Sn—Bi hard-particle-based sintered material with which reduction in seizure resistance as time passes can be prevented.

Means for Solving the Problems

The present invention is directed to a sintered alloy which contains, by mass %, from 1 to 15% of Sn, from 1 to 15% of Bi, and from 1 to 10% of hard particles having an average diameter of from 50 to 70 μm, the balance being Cu and unavoidable impurities, and in which the Bi phase and the hard particles are dispersed in the copper matrix. The Pb-free copper alloy sliding material of the present invention is characterized in that all of the hard particles are bonded to the copper matrix. The present invention is hereinafter described in detail.

(1) Composition

Sn: In the present invention, Sn is an element which strengthens the matrix. In addition, Sn enhances a recrystallization temperature and hence exerts an influence upon the sintered structure. When the Sn content is less than 1 mass %, the recrystallization temperature of Cu alloy is so low that Bi preferentially covers up the surfaces of copper alloy powder as is described in a paragraph (3) "Sintering Method." As a result, the hard particles are difficult to bond to the copper matrix. On the other hand, when the Sn content is 15 mass % or more, Cu—Sn intermetallic compounds are formed and embrittle the copper alloy matrix. The seizure resistance in the initial sliding period becomes poor. The Sn content is preferably from 2 to 10 mass %, and more preferably from 2 to 6 mass %.

Bi: Bi is an element which exhibits similar effects to Pb in conventional materials. Bi enhances compatibility and seizure resistance. In addition, Bi forms a liquid phase required for liquid-phase sintering. When the Bi content is less than 1 mass %, Bi exposed on the surface during an initial sliding period is too small in amount to attain a satisfactory seizure resistance during the initial sliding period. On the other hand, when the Bi content is 15 mass % or more, contact between the hard particles and Bi is likely to occur, so that holding of the hard particles becomes difficult. As a result, it is difficult to prevent flowing of the Cu matrix and thus the seizure resistance decreases. The Bi content is preferably from 2 to 10 mass %, and more preferably from 3 to 8 mass %.

Hard Particles: Hard particles serve as a component which enhances wear resistance and suppresses flow of the Cu matrix. When the content of hard particles is less than 1 mass %, these effects are not quite satisfactory to attain high seizure resistance. On the other hand, when the content of hard particles is 10 mass % or more, the particle/matrix interface provides a starting point, at which metal fatigue is liable to occur, and, therefore, seizure resistance lowers. Examples of the hard particles, which may be used, include Fe—P based compounds, such as $Fe_3P$ and $Fe_2P$; phosphides, such as $Ni_3P$; borides, such as NiB, $Ni_3B$, CrB, $ZrB_2$, CoB, TiB, $TiB_2$, $VB_2$, $TaB_2$, WB, MoB, and Fe—B; carbides such as $Al_4C_3$, SiC, WC, $Fe_3C$, $Mo_2C$, and $Mn_3C$, intermetallic compounds, such as Ni—Sn based, Fe—W based, Fe—Mo based, Fe—Mn based, Cr—Al based, V—Al based, Ti—Al based, W—Al based, and Si—Mn based intermetallic compounds; Ni-based self fluxing alloys; and Co-based self-fluxing alloys. Most preferable hard particles are Fe—P based compounds, such as $Fe_3P$ and $Fe_2P$, because a diffusion between the copper matrix and this compound is likely to occur during sintering, and hardness of this compound is appropriate.

When the average particle diameter of these hard particles is less than 5 μm, their effect to prevent the copper matrix from flowing is slight, and, therefore, time-dependent reduction of seizure resistance becomes serious. On the other hand, when the average particle diameter of hard particles is 70 μm or more, there is a high possibility that the hard particles and the Bi phase will be present sharing the same sites. Therefore, bonding of the hard particles to the copper matrix becomes difficult, and seizure resistance decreases as time passes. Average particle diameter of the hard particles is preferably from 10 to 50 μm, more preferably from to 15 to 40 μm.

P:P can be added as a copper matrix component. Effects of P include enhancing sintering property of the copper matrix and the alloy's bonding property with a backing metal. When P content is less than 0.02 mass %, these effects are small. When the P content exceeds 0.2 mass %, the copper matrix is so hardened that seizure resistance decreases and its bonding property with backing metal also deteriorates.

Components other than the above mentioned ones are impurities. In particular, Pb is admissible only at an impurity level.

(2) Structure

The fundamental structural constituent phases of the Cu—Sn—Bi-hard particle based sintered material according to the present invention are the copper matrix, the Bi phase and the hard particles. The Bi phase and the hard particles are present at the boundaries of constituent particles of the copper matrix. These points are common to the structure of the materials disclosed in Patent Documents 1 and 2. A characteristic structure according to the present invention resides in the point that, on the sliding surface, the hard particles are all bonded to the copper matrix. In this regard, when the hard particles are phosphide, which is liable to mutually diffuse into the copper matrix, and vice versa, mutual diffusion between P of the hard particles and Cu of the matrix occurs, resulting in bonding between the hard particles and the copper matrix without intermediary of the Bi phase. Thus, the bonding strength is high. In addition, sintering is preferably carried out through electric resistance heating, rather than high frequency induction heating employed in Patent Document 2.

There are two types of bonding formats for the hard particles: one is bonding with the copper matrix, and the other is bonding with the Bi phase. Bonding strength between the hard particles and the Bi phase is attributable to an anchoring effect that causes the "morphological bonding." Meanwhile, the bonding strength between the phosphide-based hard particles and the copper matrix is attributable to mutual diffusion that causes the "diffusion bonding," which is strong. Difficulty in flow of the copper matrix is due to the latter bonding strength. In addition, even when the Bi phase softens due to the rise in temperature on the sliding surface, the copper matrix does not become flowable in the vicinity of hard particle, because the copper matrix bonded to the hard particles and they do not undergo softening at all.

Contrary to this, the structure outside the scope of the present invention does not exclude the presence of hard particles that are bonded only to the Bi phase. With such a structure, when a load is exerted by a mating shaft, the hard particles are liable to sink in. In addition, when Bi so softens due to a temperature rise of the sliding surface, the bonding strength mentioned above decreases and a mating shaft easily acts on the copper matrix to flow. As a result the copper covers up the Bi phase, thereby decreasing the exposed surface area of the Bi phase.

Next, the number of the hard particles is as many as approximately 20 to 80 per $mm^2$ of field of view. In the case where at least one of these hard particles is not bonded to the matrix, if the copper matrix surrounding this one hard particle softens, then the copper matrix in its vicinity starts to flow, thereby leading to minute seizure. Once minute seizure takes place, this grows up to the entire seizure of parts.

According to the present invention, every one of the hard particles of sintered material can be bonded to the copper matrix by means of the sintering method described below. Nevertheless, there is such a case where a sliding surface of a sliding member is predetermined, and further its sliding surface, that is, a wearing depth of a sliding member during service life is anticipated. For example, when an AT bush has an anticipated wear depth of approximately from 10 to 80 μm, it is sufficient that a bonding state of interest be ensured in such depth.

(3) Sintering Method

In the present invention, for example, hard particles of a Fe—P based compound and a Cu—Sn—Bi based alloy are sintered. Raw material powder may be an atomized powder or the like. The structural control of the present invention is also described in comparison with the prior art. According to the structural controlling method of Patent Document 1, the hard particles are present in the Bi phase. Fe—P based compounds are not used as the hard particles. In addition, the hard particles include those in contact only with the Bi phase but not in contact with the copper matrix. According to the structural controlling method of Patent Document 2, when the individual hard particles are looked at, a half or less circumferential length of a hard particle is incorporated in the Bi phase. Contrary to this, incorporation of individual hard particles in the Bi phase (the hard-particle contact ratio) according to the present invention may be or may not be 50% or less but must not be 100% (complete non-contact of the hard particles with the copper matrix). In addition, when the hard particles as a whole are looked at, the structural controlling method of Patent Document 2 regulates so as to make the possibly largest proportion of the hard particles to be in non-contact with the Bi phase. In the present invention, a contact proportion with the Bi phase is not limited. All of the hard particles are in contact with the copper matrix. In order to realize contact of the entire hard particles with copper matrix according to the inventive characteristics, it is important to control the following sintering process in an electric furnace.

In the sintering process, the following two processes (a) and (b) are involved. (a) Hard particles of, for example Fe—P based compound are sintered and bonded to the copper matrix. (b) Bi is forced out from the interior of Cu—Sn—Bi based alloy powder to an interface of the hard particles and alloy powder. It is believed that these processes separately proceed. In the former process, in which the Fe—P based compound is sintered and bonded to the copper matrix, P of the Fe—P based compound deoxidizes the surfaces of the Cu—Sn—Bi based alloy powder at a temperature of 400 degrees C. or more, and hence enhances activity of such surfaces. As a result, bonding between the Fe—P based compound and the copper matrix is promoted. This deoxidization and bonding of hard particles is more liable to occur, when the temperature rise gradient is smaller during the temperature-elevating stage. Preferably, the temperature-elevating gradient falls within a range from 300 to 1000 degrees C./min in a temperature range of room temperature to 600 degrees C. When the temperature gradient is excessively low, the deoxidizing effect of P is lost during the elevation of temperature. On the other hand, when it is very high, Bi leaves the Cu—Sn—Bi powder and accumulates around the Fe—P based compound hard particles. Such accumulation occurs earlier than activity increase of powder surface occurs.

In the latter process (b), Cu—Sn—Bi based powder, which has undergone melt-quenching and solidification through atomization, recrystallizes at approximately 400 degrees C. or higher, thereby rearranging the crystals; Bi of the Cu—Sn—Bi based powder is driven to the interface of the powder; and, Bi accumulates at locations, where the Fe—P based compound is present. The location of accumulated Bi and the location of Fe—P based compound virtually overlap under conditions, in which Bi is completely driven out. However, when the recrystallizing temperature of copper alloy is excessively low, Bi is driven out of the copper alloy powder at low temperature and covers up the entire surface of the particles of copper alloy powder, thereby impeding bonding between the hard particles and copper matrix. This means that the probability of both locations being in coincidence is virtually 100%. Meanwhile, when the amount of hard particles is considerably large relative to that of Bi, the probability mentioned above is so low that the hard particles are bonded to the copper matrix without intermediary of Bi at high probability.

BEST MODE FOR CARRYING OUT THE INVENTION

EXAMPLE 1

A preliminary copper alloy having a Cu—Sn—Bi composition shown in Table 1 was prepared. This alloy was subjected to atomization procedure to obtain a powder having a particle diameter of 150 µm or less. In addition, the Cu—Sn—Bi alloy powder and the hard particles shown in Table 1 were mixed with a V-type blender under ordinary conditions. The mixed powder was dispersed on a steel sheet of 150 mm (width)×2000 mm (length) to lay the powder in a 1-mm thickness. Sintering was carried out in an electric furnace under hydrogen atmosphere. The sintering conditions were as follows. The temperature gradient: set at 600 degrees/min in a temperature range of from room temperature to 600 degrees C.; sintering temperature: from 700 to 900 degrees C.; sintering time: from 5 to 30 minutes. Subsequent to sintering, the sintered layer was densified by rolling. The second sintering was then carried out again under the same conditions.

TABLE 1

|   |    |     | Bi mass % | Sn mass % | P mass % | Hard Particles | | | Seizure Resistance(#) | |
|---|----|-----|-----------|-----------|----------|------|--------|---------|---------|----------|
|   |    | Cu  |           |           |          | Type | Amount mass % | Average Particle Diameter µm | Initial | After Stationary Sliding |
| I | 1  | Bal | 1  | 1  | 0 | Fe₃P | 3  | 30 | 20 | 20 |
|   | 2  | Bal | 1  | 5  | 0 | Fe₃P | 3  | 30 | 20 | 20 |
|   | 3  | Bal | 1  | 15 | 0 | Fe₃P | 3  | 30 | 24 | 24 |
|   | 4  | Bal | 5  | 1  | 0 | Fe₃P | 3  | 30 | 40 | 36 |
|   | 5  | Bal | 5  | 5  | 0 | Fe₃P | 3  | 30 | 40 | 36 |
|   | 6  | Bal | 5  | 15 | 0 | Fe₃P | 3  | 30 | 36 | 36 |
|   | 7  | Bal | 15 | 1  | 0 | Fe₃P | 3  | 30 | 32 | 28 |
|   | 8  | Bal | 15 | 5  | 0 | Fe₃P | 3  | 30 | 32 | 28 |
|   | 9  | Bal | 15 | 15 | 0 | Fe₃P | 3  | 30 | 32 | 32 |
|   | 10 | Bal | 5  | 5  | 0 | Fe₃P | 1  | 30 | 36 | 36 |
|   | 11 | Bal | 5  | 5  | 0 | Fe₃P | 10 | 30 | 32 | 32 |
|   | 12 | Bal | 5  | 5  | 0 | Fe₃P | 3  | 10 | 32 | 28 |
|   | 13 | Bal | 5  | 5  | 0 | Fe₃P | 3  | 68 | 36 | 36 |
|   | 14 | Bal | 1  | 1  | 0 | Fe₂P | 3  | 30 | 24 | 24 |

TABLE 1-continued

|   |    | Cu  | Bi mass % | Sn mass % | P mass % | Hard Particles Type | Amount mass % | Average Particle Diameter μm | Seizure Resistance(#) Initial | After Stationary Sliding |
|---|----|-----|-----------|-----------|----------|---------------------|---------------|------------------------------|-------------------------------|--------------------------|
|   | 15 | Bal | 1         | 5         | 0        | Fe₂P                | 3             | 30                           | 20                            | 20                       |
|   | 16 | Bal | 1         | 15        | 0        | Fe₂P                | 3             | 30                           | 28                            | 24                       |
|   | 17 | Bal | 5         | 1         | 0        | Fe₂P                | 3             | 30                           | 36                            | 40                       |
|   | 18 | Bal | 5         | 5         | 0        | Fe₂P                | 3             | 30                           | 40                            | 40                       |
|   | 19 | Bal | 5         | 15        | 0        | Fe₂P                | 3             | 30                           | 32                            | 32                       |
|   | 20 | Bal | 15        | 1         | 0        | Fe₂P                | 3             | 30                           | 32                            | 32                       |
|   | 21 | Bal | 15        | 5         | 0        | Fe₂P                | 3             | 30                           | 32                            | 28                       |
|   | 22 | Bal | 15        | 15        | 0        | Fe₂P                | 3             | 30                           | 28                            | 32                       |
|   | 23 | Bal | 5         | 5         | 0        | Fe₂P                | 1             | 30                           | 32                            | 28                       |
|   | 24 | Bal | 5         | 5         | 0        | Fe₂P                | 10            | 30                           | 32                            | 32                       |
|   | 25 | Bal | 5         | 5         | 0        | Fe₂P                | 3             | 10                           | 16                            | 32                       |
|   | 26 | Bal | 5         | 5         | 0        | Fe₂P                | 3             | 68                           | 12                            | 32                       |
| II | 1 | Bal | —         | 5         | 0        | Fe₃P                | 3             | 30                           | 28                            | 12                       |
|   | 2  | Bal | 20        | 5         | 0        | Fe₃P                | 3             | 30                           | 16                            | 8*                       |
|   | 3  | Bal | 5         | 0.5       | 0        | Fe₃P                | 3             | 30                           | 36                            | 12                       |
|   | 4  | Bal | 5         | 20        | 0        | Fe₃P                | 3             | 30                           | 28                            | 12                       |
|   | 5  | Bal | 5         | 5         | 0        | Al₂O₃               | 3             | 30                           | 36                            | 16                       |
|   | 6  | Bal | 5         | 5         | 0        | —                   | —             | —                            | 36                            | 16                       |
|   | 7  | Bal | 5         | 5         | 5        | Fe₂P                | 15            | 30                           | 24                            | 8*                       |
|   | 8  | Bal | 5         | 5         | 0        | Fe₂P                | 3             | 98                           | 20                            | 8*                       |
|   | 9  | Bal | 5         | 5         | 0        | Fe₂P                | 3             | 0.3                          | 32                            | 8*                       |

Remarks: I—inventive example 1, II—comparative example 1,
*Seizure occurred upon step up,
(#)Surface Pressure, MPa Seizure resistance tests were carried out using the following methods and under the following conditions.
(1) Test of Initial Seizure
  Tester—a pin-on-disc tester
  Load—stepped up by 4 MPa/10 min
  Oil Type—paraffin-based oil
  Oil Temperature—room temperature
  Material of Mating Member—SUJ2
(2) Seizure Resistance Test after Stationary Sliding
  Tester—a pin-on-disc tester
  Load—sliding under 8 MPa for 300 minutes, with subsequent step-ups at a rate of 4 MPa/10 min
  Oil Type: paraffin-based oil
  Oil Temperature—room temperature
  Material of Mating Member—SUJ2

The comparative examples in Table 1 were found to exhibit poor properties. Specifically, since Comparative Example 1 is free of Bi, initial seizure resistance and resistance after stationary sliding are poor. Since Comparative Example 2 has a high Bi content, initial seizure resistance and seizure resistance after initial sliding are poor as well. Since Comparative Example 3 has a low Sn content, although it has good initial seizure resistance, seizure resistance after stationary sliding is poor. Since Comparative Example 4 has a high Sn content, initial seizure and seizure resistance after stationary sliding are poor. Since the hard particles of Comparative Example 5 are Al₂O₃, although initial seizure resistance is good, seizure resistance after stationary sliding is poor. Since Comparative Example 6 is free of hard particles, although initial seizure resistance is good, seizure resistance after stationary sliding is poor. Since Comparative Example 7 has a high additive content of hard particles, the seizure resistance after stationary sliding is poor. Since the average particle diameter of the hard particles is large in Comparative Example 8, although initial seizure resistance is good, seizure resistance after stationary sliding is poor. Since the average particle diameter of the hard particles is small in Comparative Example 9, although initial seizure resistance is good, the seizure resistance after stationary sliding is poor.

Observation of the structure was carried out as follows. A portion of the above-mentioned sliding material which can be applied to actual components was determined. Three locations in such a portion, each having an area of 10 mm×10 mm under an optical microscope with a field of 0.50 mm² and a magnification of ×100. Observation must be repeated six hundred times. First, a preliminary test was carried out six hundred times for No. 1 and No. 22 sample in Table 1 under a PC controlled microscope produced by OLYMPUS Co., Ltd. It was confirmed at each observation that all the hard particles were bonded to the copper matrix on the sliding surface.

Next, the same optical microscopic observation as described above was carried out for the sintered materials of Nos. 11 and 12 samples listed in Table 1 of Patent Document 2. In one of the thirteen observations, hard particles were found to be completely incorporated into the Bi phase.

The above-described preliminarily microscopic observation has confirmed that: no segregation is induced by the sintering method; and, the material is homogeneous in the microscopic field of view mentioned above. Therefore, observation of representative locations under a microscope is sufficient to determine the entire material structure. From these considerations, each of the materials other than Nos. 1 and 22 in Table 1 was subjected to microscopic observation of randomly chosen locations fifty times. The microscopic observation revealed that all the hard particles are bonded to the copper matrix. In addition, the inventive examples exhibited good initial seizure resistance and seizure resistance after stationary sliding.

Sample Nos. 5, 9 and 21, which represent inventive examples, were polished. Microscope photographs of the polished surfaces are shown in FIGS. 1, 2 and 3, respectively. It is clear from these photos that the hard particles are bonded to the copper matrix. These microphotographs are now compared with a microscopic photograph shown in Patent Document 2 (10% Bi-2% $Fe_3P$-1% $Fe_2P$-balance Cu). Note that the Bi phase is observed as isolate particles having indefinite shapes. The number of such a Bi phase per identical surface area should be paid attention. However, since the Bi content and the amount of hard particles are not identical in these materials, when this fact is taken into consideration in the comparison, there is a tendency that the number of the Bi phase according to the present invention is smaller than that of Patent Document 2. This comparison in structure also supports the high likelihood that the Fe—P compound contacts the copper matrix but not the Bi phase.

FIG. 4 shows the results of Comparative Example 2. As is clear from FIG. 4, hard particles are completely surrounded by the Bi phase. Since Comparative Example 3 has a low Sn content and hence a low recrystallizing temperature, several hard particles are completely surrounded by the Bi phase.

EXAMPLE 2

As shown in Table 2, P was added to several of the compositions of Example 1 in Table 1. Test Samples were prepared by the same method employed for those in Table 1, and the same test procedure was followed. In Example 2, in which appropriate amount of P is added, the surface pressure, at which the initial surface pressure occurred, and the surface pressure, at which seizure occurred after stationary sliding, were found to be improved over those of Example 1, in which P is not added. This is because added P further promotes diffusion and hence diffusion bonding between the copper matrix and the hard particles, thereby improving holding of the hard particles. Meanwhile, when P is added excessively as shown in Table 2, Comparative Example 2, the seizure surface pressures of initial sliding and after stationary sliding seriously decreases.

INDUSTRIAL APPLICABILITY

As is described hereinabove, the material according to the present invention exhibits little deterioration in seizure resistance caused by sliding and hence exhibits stable performance.

Accordingly, the material of present invention can provide reliable components, such as an automatic transmission (AT) bush, a piston-pin bush, and a bush for general machines.

Figure 1:
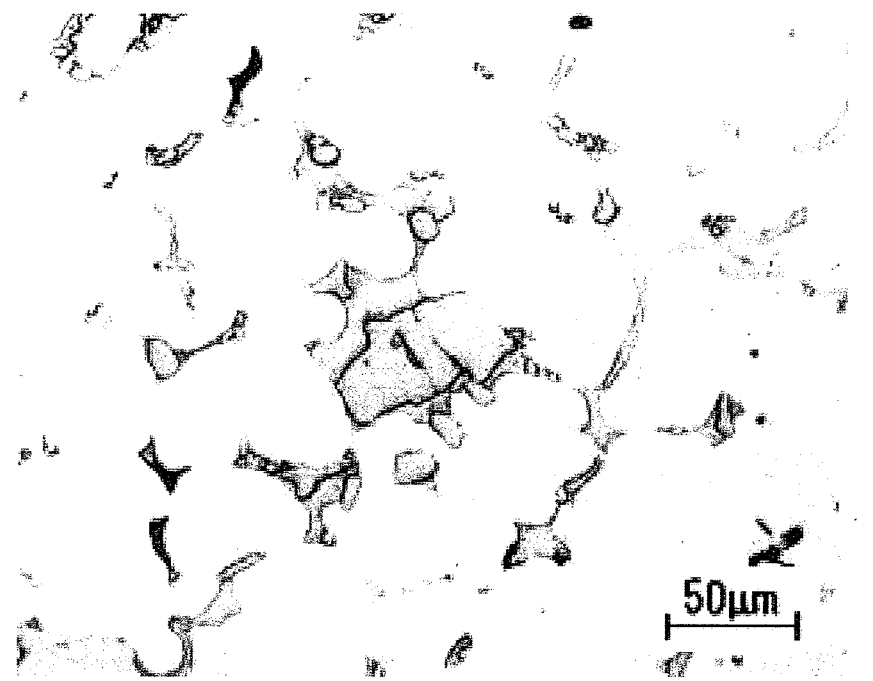
FIG. 1 An optical microphotograph (magnification: ×250) of a sintered alloy of inventive example No. 5.
Figure 2:
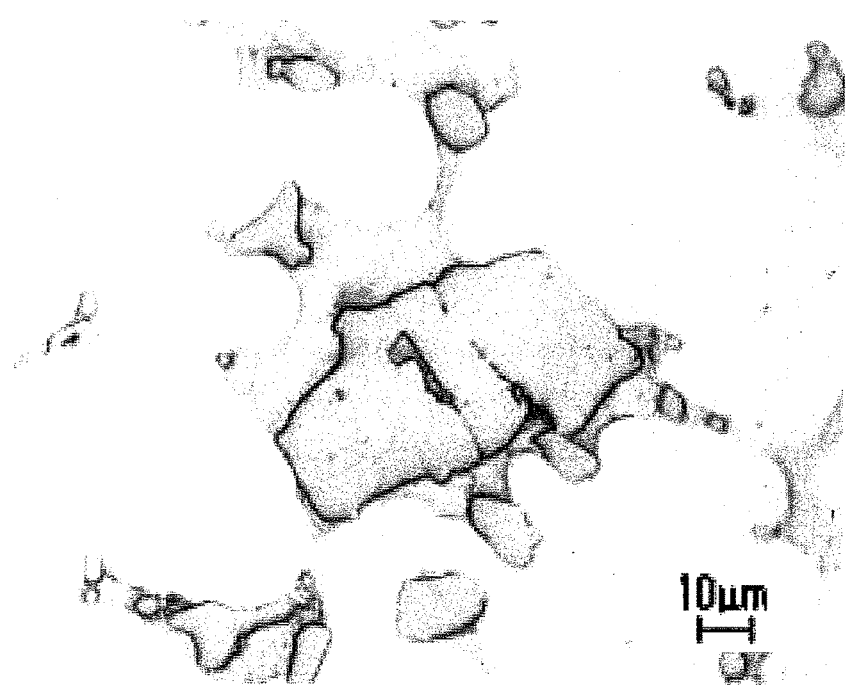
FIG. 2 An optical microphotograph (magnification: ×250) of a sintered alloy of inventive example No. 9.
Figure 3:
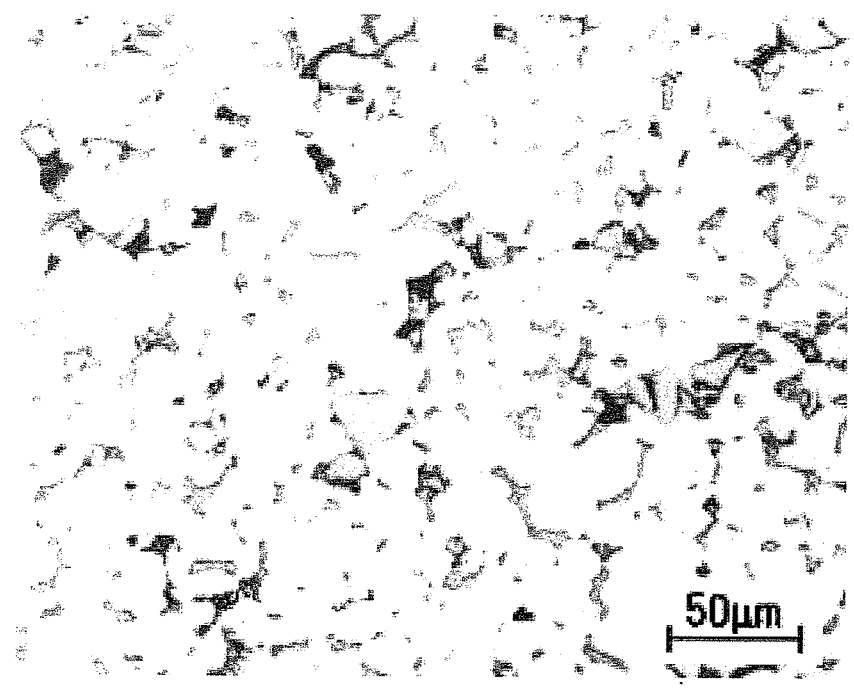
FIG. 3 An optical microphotograph (magnification: ×250) of a sintered alloy of the inventive example No. 21.
Figure 4:
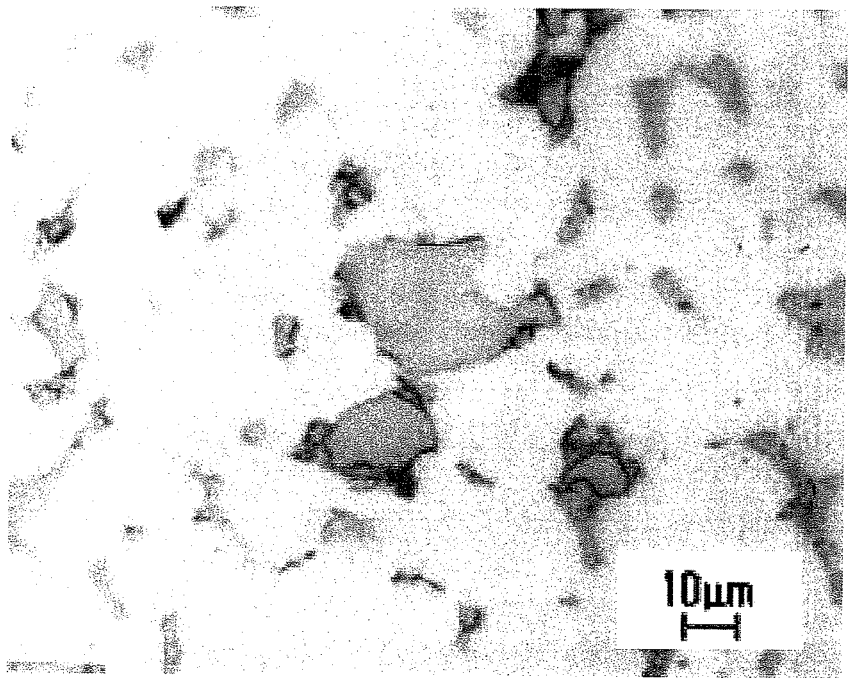
FIG. 4 An optical microphotograph (magnification: ×250) of a sintered alloy of the comparative example No. 2.

The invention claimed is:

1. A method for producing a homogeneous Pb-free sintered sliding material under observation using an optical microscope at a magnification of 100 times, by sintering, comprising:

preparing a powder of a Cu—Bi alloy and hard particles, wherein the hard particles have an average particle diameter of from 5 to 70 μm and include an Fe—P based compound, and wherein the Fe—P based compound comprises at least one selected from the group consisting of $Fe_3P$ and $Fe_2P$;

mixing the Cu—Bi alloy powder and the hard particles, so that a mixture obtained by mixing consists of, by mass %, 1 to 10% of the hard particles, with the balance

TABLE 2

| | | Cu | Bi mass % | Sn mass % | P mass % | Hard Particles | | | Seizure Surface Pressure, MPa | |
|---|---|---|---|---|---|---|---|---|---|---|
| | | | | | | Type | Amount mass % | Average Particle Diameter μm | Initial | After Stationary Sliding |
| I | 1' | Bal | 1 | 1 | 0.04 | $Fe_3P$ | 3 | 30 | 24 | 24 |
| | 2' | Bal | 1 | 5 | 0.08 | $Fe_3P$ | 3 | 30 | 28 | 28 |
| | 4' | Bal | 5 | 1 | 0.08 | $Fe_3P$ | 3 | 30 | 48 | 40 |
| | 5' | Bal | 5 | 5 | 0.08 | $Fe_3P$ | 3 | 30 | 44 | 44 |
| | 7' | Bal | 15 | 1 | 0.15 | $Fe_3P$ | 3 | 30 | 36 | 36 |
| | 8' | Bal | 15 | 5 | 0.15 | $Fe_3P$ | 3 | 30 | 36 | 36 |
| | 10' | Bal | 5 | 5 | 0.08 | $Fe_3P$ | 1 | 30 | 40 | 48 |
| | 11' | Bal | 5 | 5 | 0.17 | $Fe_3P$ | 10 | 30 | 40 | 36 |
| | 12' | Bal | 5 | 5 | 0.04 | $Fe_3P$ | 3 | 10 | 36 | 32 |
| | 13' | Bal | 5 | 5 | 0.08 | $Fe_3P$ | 3 | 68 | 44 | 44 |
| | 15' | Bal | 1 | 5 | 0.08 | $Fe_2P$ | 3 | 30 | 28 | 28 |
| | 18' | Bal | 5 | 5 | 0.08 | $Fe_2P$ | 3 | 30 | 48 | 44 |
| | 21' | Bal | 15 | 5 | 0.15 | $Fe_2P$ | 3 | 30 | 36 | 40 |
| | 24' | Bal | 5 | 5 | 0.17 | $Fe_2P$ | 10 | 30 | 32 | 32 |
| II | 1' | Bal | 1 | 1 | 0.25 | $Fe_3P$ | 3 | 30 | 8 | 16* |
| | 4' | Bal | 5 | 1 | 0.30 | $Fe_3P$ | 3 | 30 | 16 | 8* |
| | 8' | Bal | 15 | 5 | 0.25 | $Fe_3P$ | 3 | 30 | 20 | 8* |
| | 10' | Bal | 5 | 5 | 0.25 | $Fe_3P$ | 1 | 30 | 16 | 8* |
| | 11' | Bal | 5 | 5 | 0.35 | $Fe_3P$ | 10 | 30 | 12 | 8* |
| | 13' | Bal | 5 | 5 | 0.25 | $Fe_3P$ | 3 | 68 | 20 | 8* |
| | 21' | Bal | 15 | 5 | 0.25 | $Fe_2P$ | 3 | 30 | 20 | 8* |
| | 24' | Bal | 5 | 5 | 0.35 | $Fe_2P$ | 10 | 30 | 12 | 8* |

Remarks: I—inventive example 2, II—comparative example 2,
*Seizure occurred upon step up being Cu—Bi alloy, containing from 1 to 15% of Bi, and unavoidable impurities;

heating the mixture of the Cu—Bi alloy powder and the hard particles to a sintering temperature of 700° C. to 900° C., thereby forming a liquid phase of Bi, which is present as a Bi phase around at boundaries of a Cu matrix after sintering, and presenting said hard particles at boundaries of the Cu matrix; and, controlling a temperature—elevating gradient, in terms of ° C./min, in a temperature range of from room temperature to 600° C., to 300 to 1000° C./min, wherein all of the hard particles are bonded with the Cu matrix without any intermediary of the Bi phase and are bonded with the Bi phase at a length ratio of less than 100%, in a sintered structure in which the Bi phase and the hard particles are present at boundaries of the Cu matrix.

2. The method according to claim 1, wherein said Cu—Bi alloy consists of, by mass %, from 1 to 15% of Bi, with the balance being Cu and unavoidable impurities.

3. The method according to claim 1, wherein said Cu—Bi alloy consists of, by mass %, from 1 to 15% of Bi, 0.02 to 0.2% of P, with the balance being Cu and unavoidable impurities.

4. The method according to claim 1, wherein the Pb-free sintered sliding material is in the form of a sliding member having a sliding surface, on which surface all of said hard particles are bonded with the Cu matrix, at a depth of from 10 to 80 μm.

5. The method according to claim 1, wherein the sintering is carried out for 5 to 30 minutes.

6. The method according to claim 5, wherein the sintering is carried out in an electric furnace.

7. The method according to claim 1, wherein the sintering steps are repeated twice with an intermediate rolling.

8. The method according to claim 2, wherein the sintering steps are repeated twice with an intermediate rolling.

* * * * *